H. B. NICHOLS.
AUTOMATIC CALIPERING ATTACHMENT.
APPLICATION FILED DEC. 27, 1909.
980,164.
Patented Dec. 27, 1910.
6 SHEETS—SHEET 2.
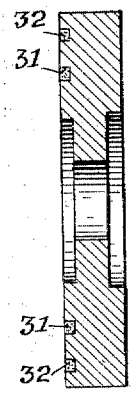
Fig. 8.
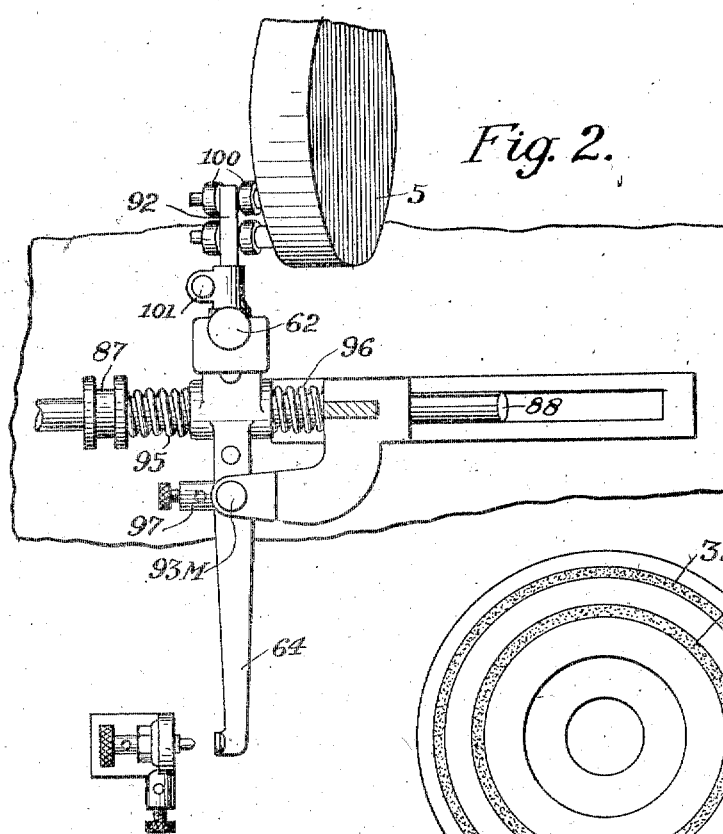
Fig. 2.
Fig. 7.
Fig. 9.
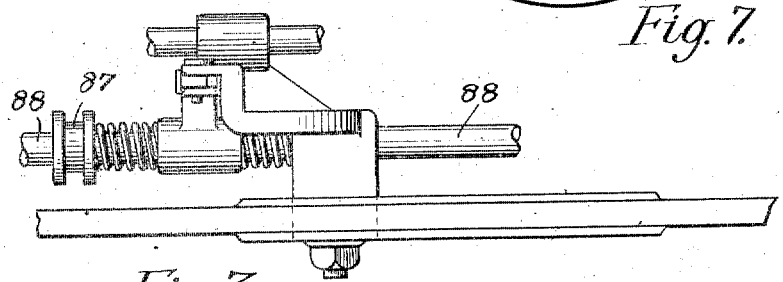
Fig. 3.
WITNESSES
INVENTOR
Henry B. Nichols
by Edward E. Clement
Attorney

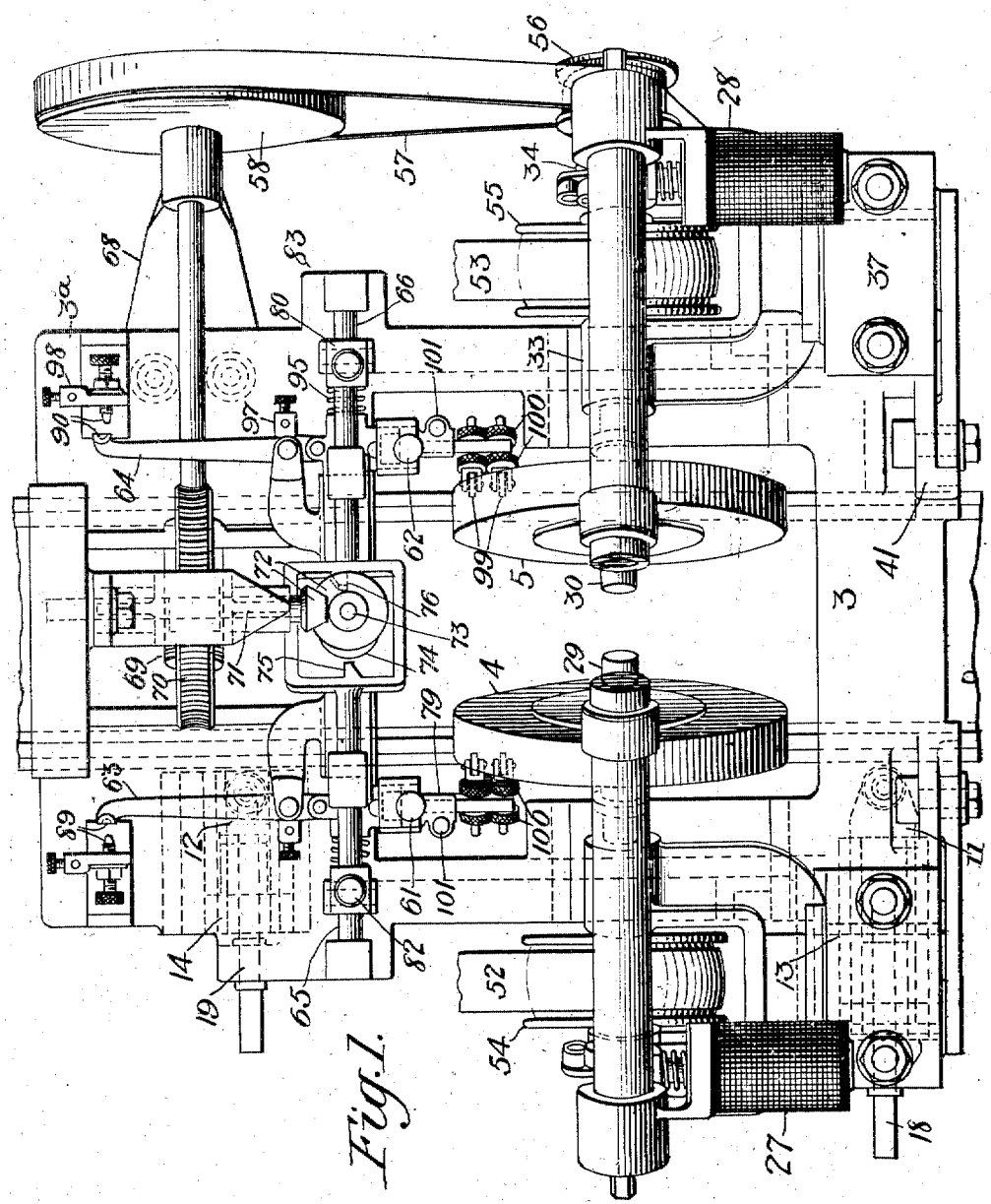

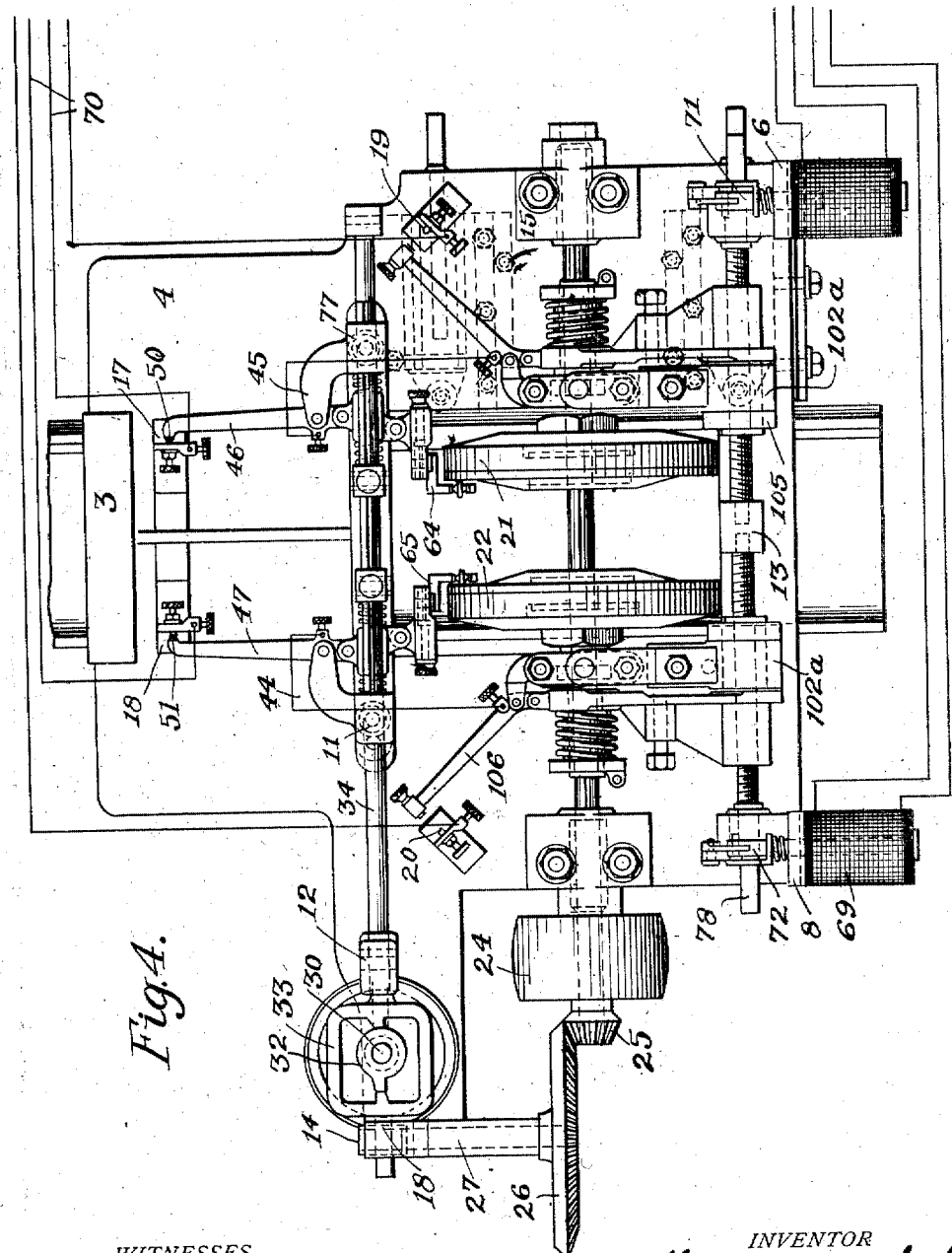

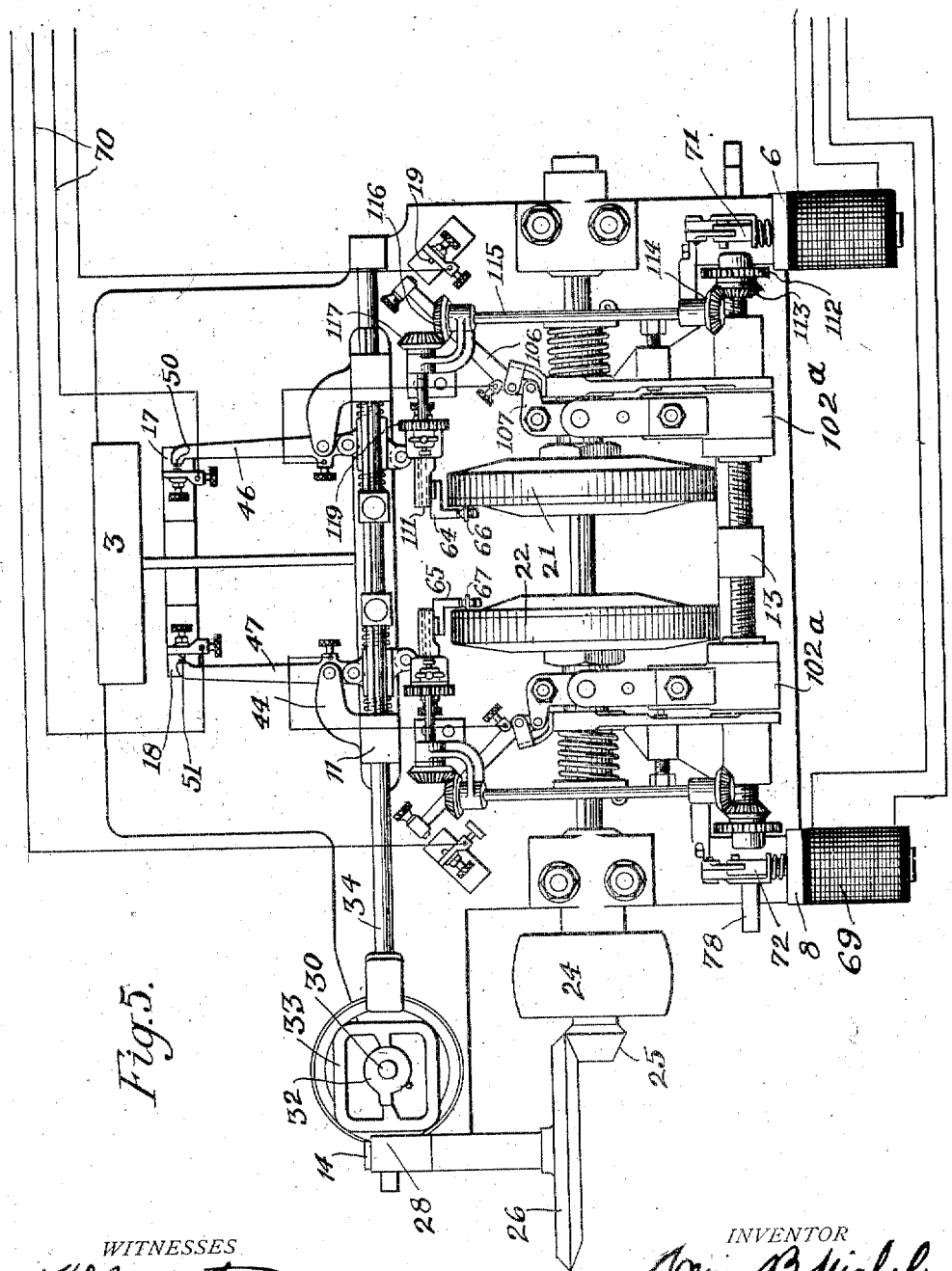

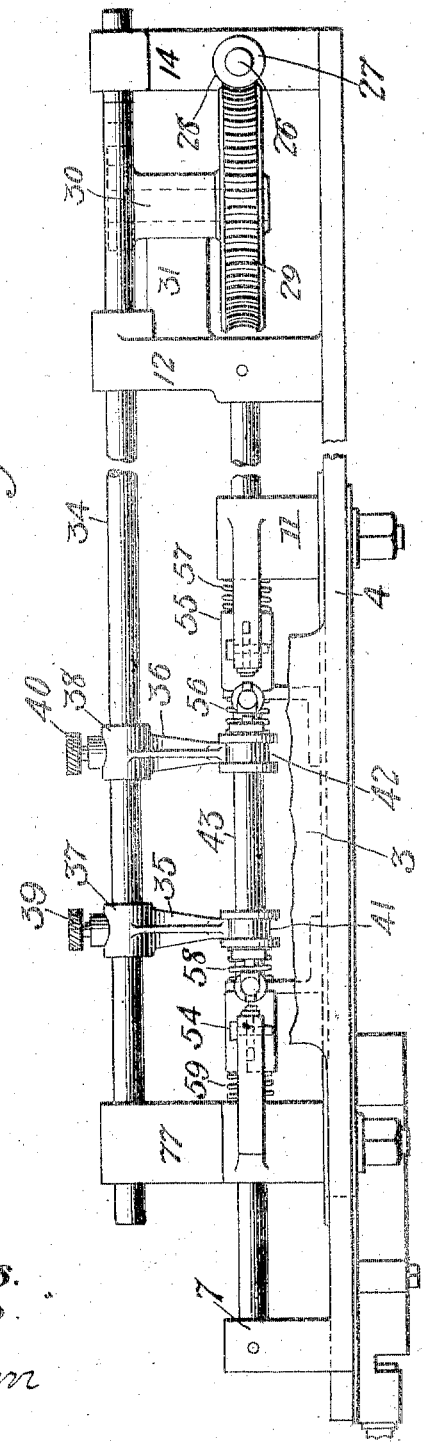

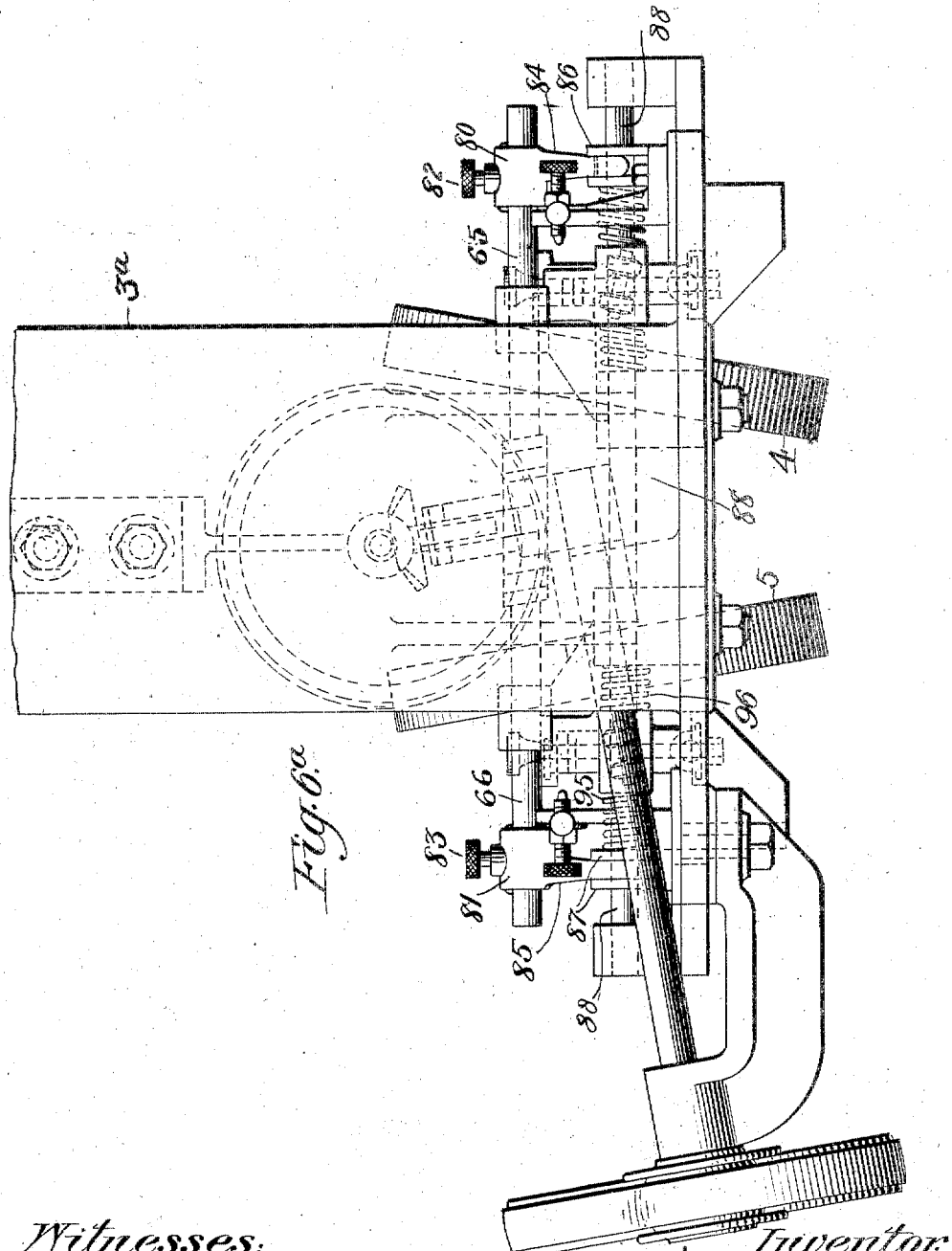

UNITED STATES PATENT OFFICE.

HENRY B. NICHOLS, OF PHILADELPHIA, PENNSYLVANIA.

AUTOMATIC CALIPERING ATTACHMENT.

980,164.  Specification of Letters Patent.  Patented Dec. 27, 1910.

Original application filed September 5, 1908, Serial No. 451,875, and January 14, 1909, Serial No. 472,236. Divided and this application filed December 27, 1909. Serial No. 535,091.

*To all whom it may concern:*

Be it known that I, HENRY B. NICHOLS, a citizen of the United States, residing at Philadelphia, in the county of Philadelphia and State of Pennsylvania, have invented certain new and useful Improvements in Automatic Calipering Attachments, of which the following is a specification, reference being had therein to the accompanying drawing.

My invention relates to grinding machines and especially to automatic calipering devices used therein.

The present application is a division in part of each of two prior applications, viz: Serial No. 451,875, filed September 5, 1908, patented December 28, 1909, Patent No. 944,902; and Serial No. 472,236, filed January 14, 1909, patented December 28, 1909, Patent No. 944,903. In both of said applications grinding machines are disclosed for grinding railway rails, and in both cases automatic calipers are described which act upon the wheel surfaces to regulate the feed of the wheels and thereby maintain the cut constant. In said applications the claims are directed particularly to the grinding machines as such and to various combinations of the elements thereof including automatic calipers; and the claims in the present case will be directed to the calipers by themselves which are capable of use in other forms of machine.

My invention is illustrated in the accompanying drawings in which—

Figure 1 is a plan view of the machine claimed in my application Serial No. 451,875, Patent No. 944,902, showing the calipering device. Figs. 2 and 3 are detail figures showing the caliper with other parts removed. Fig. 4 is a plan view similar to Fig. 1 of the machine shown in my application Serial No. 472,236, Patent No. 944,903. Fig. 5 is a similar view of a modification. Fig. 6 is a rear elevation. Fig. 7 is a face view of the wheel showing the ring inserts. Fig. 8 is a section thereof on the line 8—8 of Fig. 7. Fig. 9 is a sectional view of a modification having the inserts on the back.

I will not attempt to describe in detail herein the machines to which the present invention is applied. For a full disclosure of said machines I refer to my aforesaid Patents Nos. 944,902 and 944,903. The caliper apparatus by itself however may be described as follows: Figs. 1, 2 and 3 illustrate the form of calipers shown in my Patent No. 944,902, (Serial No. 451,875). After reading said patent the adjustment of the grinding wheels will be fully understood. Assuming the bushing of the wheel to be splined on its spindle, or the spindle to have end play on its bearings, the wheel is moved to and from the work by means of a screw, nut, and arm carrying with it the grinding head, always on a line normal to the work surface, so as to maintain the angle of the cut constant, while compensating for wear. The adjustment thus described could of course be brought about manually, but one of my principal objects is to make this automatic, and dependent upon as well as proportionate to the actual wear on the surface of the wheel. This object is attained by the use of the automatic calipers, which will now be described.

The two spindles 29 and 30 are driven by belts 52 and 53 taking over pulleys 54 and 55 secured upon the spindles intermediate of the U-arms of the respective brackets 27 and 28. For the sake of uniformity in grinding, both belts preferably derive their power from the same countershaft, which is not shown but which may be either above or to the rear of the machine.
One of the spindles 30 carries a pulley 56 outside of its bearing, from which a belt 57 passes to the pulley 58 of the calipering mechanism. The latter is mounted on a rearward extension 3ª of the frame 3, and comprises the caliper levers 59 and 60 pivoted at 61 and 62, provided with rearwardly extending contact arms 63 and 64 and periodically actuated by a double reciprocating slide bar 65, 66, having an intermediate cam frame 67 and driven through a worm wheel from the spindle 68 and pulley 58. It should be noted that the driving pulleys of the spindles 29 and 30 are preferably connected thereto with a universal motion, so that their axes will remain parallel to the countershaft for all angular adjustments of the spindles, their centers at the same time remaining fixed, each in the axis prolonged of its trunnion 36, so there is no variation in the tension of the belts. A similar effect may be produced by giving these pulleys approximately spherical surfaces, or curving them on the centers. In order to avoid excessive twisting of the belt 57, the driving spindle 68 of the calipering device is permanently set at an angle so that its axis will parallel to the axis of the spindle 30, from which it is driven, when the latter spindle is in its normal or intermediate position, equidistant from both extremities of its angular path of travel. By this means the planes of the pulleys 56 and 58 diverge from each other by only one-half the total angle of adjustment of the spindle 30, through its entire range.

The worm 69 drives the wheel 70, which turns a short stub shaft 71 journaled in the frame 3ᴬ. This stub shaft in turn communicates motion through miter gears 72 to an upstanding shaft 73 carrying a cam 74 which as it rotates impinges on one and then the other of the cam projections 75, 76 formed on opposite sides of the frame 67, thus throwing the frame alternately in opposite directions and carrying with it the slide bars 65—66. On the ends of these bars are collars 80 and 81, secured by set screws 82 and 83 and provided with depending fingers 84—85 the lower ends of which engage between flanges on the collars 86 and 87 fitted to slide upon the fixed bar 88, mounted below and parallel to the double bar 65 and 66. Thus, as the upper bar is reciprocated by the double or actuating cams, the collars move with it, and in so moving they advance their associated calipers one at a time into engagement with the surface of the wheel, and if the latter is worn so that the line of cut is below normal, the particular caliper in contact will become advanced far enough for the tail of its lever 63 or 64 to close contact at 89 or 90 as the case may be and thereby to effect the feed mechanism of the worm wheel.

The structure and detailed arrangement of the caliper levers is best shown in Figs. 2 and 3, which are detail views with the other parts removed. Each lever is in three parts, the body 91, the forwardly extending arm 92 and the rearwardly extending contact arm 93. The body is in the form of a sleeve sliding upon bar 88, and engaged by two coiled springs 95 and 96, the former resting against the collar 86 and the latter against an extension of the frame carrying the bearing for the shafts. These springs are normally adjusted so that the body or sleeve will remain in an intermediate position with their caliper or feeler out of contact with the wheel. The lever 93 is pivoted at 93ᴹ upon a rigid bracket projecting from the bearing portion of the frame. This pivot point is so located as to leave a long contact arm, and a relatively short actuating arm, connection of the latter with the body being effected by means of a pivot 93ᴸ. Thus, as the body reciprocates on the bar 88, the lever 93 is turned upon the pivot 93ᴹ. The arm 92 carries "feelers" shown in the form of steel rollers 99, adapted to touch the graphited rings in the face of the wheel when the caliper is actuated. These are carried upon a holder, rotatably adjustable in a socket piece 79, and locked when adjusted by means of a set screw 101. This socket piece has a vertical adjustment in the holder or yoke 92ᴱ, this being regulated by the screws 61 or 62. The springs 95 and 96 are of such relative strengths, that 96 normally overcomes 95 and forces the body 91 to the left. When the collar 86 or 87 is moved however, it compresses its associated spring 95 putting sufficient tension thereon to overcome the spring 96, thereby pushing the body 91 along the bar 88, carrying the feelers or rollers 99 into contact with their wheel, and at the same time turning the lever 93 on its pivot 93ᴹ. It will be observed that while the movement is positive, the connections are all resilient, so that no fine adjustments are required in these connections between the cam frame, the sliding bars and the calipers. The rollers 99 are held when adjusted upon the holder 60 by means of lock-nuts 100, and of course the rotation of this holder in its sleeve together with the vertical adjustment of the sleeve or socket permits the adaptation of the rollers to any position of the wheel 4 or 5. Electrical connection is effected with each caliper lever by means of a binding post 97, and the terminal contacts 89 and 90 are associated with insulated fixed terminals 98. These terminals 97 and 98 are connected in a circuit which includes a suitable source of current and the windings of the solenoid 42. Upon the closure of the contacts by either caliper, its solenoid will become energized, and will thereupon advance its wheel in the manner hereinbefore described.

It will be noted that the stub shaft 73 is not exactly vertical but is perpendicular to the spindle 68. It will appear from Fig. 2 that the cam surfaces are correspondingly inclined, bringing the points of impact of the cam 74 on the teeth 75 and 76 to the upper part of one and the lower part of the other, the frame 67 being broad enough to permit this.

It is thought the operation of the machine will be sufficiently apparent from the patent without any detailed statement thereof. As a brief recapitulation however, it may be stated that when a rail is to be ground, the machine is first set up with all the parts adjusted substantially as shown in the accompanying drawings. The rail is then introduced, and the main feed mechanism with its stops set so as to produce the length of cut desired. The wheels 4 and 5 being rotated through the driving pulleys, produce cuts of the predetermined depth, and at the predetermined angles in the head and foot flanges. The calipers are periodically brought into action in the manner heretofore pointed out, and as long as the wheel surfaces are not worn to a greater extent than the maximum variation permitted and predetermined in the work, the feed is not affected. As soon as the wheel surfaces wear however, to an amount exceeding the predetermined limit, each caliper will close its contacts 89 or 90, energizing its respective solenoid, and step around its feed screw 21 or 22 so as to move the wheel and its sleeve or bushing upon the spindle and compensate for the wear. In this manner, and by properly constructing and adjusting the calipers, the cut on a rail or any other surface produced in this machine can be kept within a percentage variation so small as to be practically negligible.

Referring to Figs. 4 and 5, 1 is a bed plate carrying a form 2, upon which the work is supported. Above the bed plate a bridge is provided, to which is bolted the upper member 3 of a bracket frame or tool support 4. This bracket frame is stiffened by a central diagonal web or flange 5, and carries upon it vertical bearing posts, 6, 7, 77, 8, 9, 10, 11, 12, 13, 14, journal boxes 15 and 16 and contact posts 17, 18, 19, 20. The two grinding wheels 21 and 22 are splined upon the driving shaft 23 journaled in the boxes 15 and 16, and carrying upon one end the driving pulley 24, as well as the bevel pinion 25 which intermeshes with and drives the bevel gear 26 journaled at 27 (see Figs. 3 and 4) and carrying at its other end a worm 28 which engages a worm gear 29 on the vertical stub shaft 30 journaled in a box on the end of a horizontal arm 31 extending from the bearing post 12, and carrying at its upper end a cam disk 32 which as it turns throws the frame 33 back and forth so as to oscillate the shaft 34, which carries depending fingers 35 and 36, secured to the shaft by sleeves 37, 38 and set-screws 39 and 40. The ends of the fingers 35 and 36 lie between flanges on the collars 41 and 42, mounted to slide on the fixed parallel shaft 43, passing through the posts 7, 11 and 77. On each of the posts 11 and 77 a bracket arm is provided as indicated at 44 and 45, the extremities of these bracket arms being bifurcated to receive the caliper levers 46 and 47, which are pivoted at 48 and 49, and carry at one extremity 50 or 51 a contact to coöperate with the fixed contacts 17, 18, and have at the other extremity a knuckle joint connection 52 or 53 with the sliding sleeves 54, 55 on the shaft 43. Each of these sleeves 54 and 55 has a pair of helical springs, one on each side of it, indicated at 56—57 and 58—59. The springs 57 and 59 rest against the solid abutments 11 and 77, while the springs 56 and 58 lie between the sleeves 54 and 55 and the collars 41 and 42. Any movement of the sleeves 54 and 55 swings the levers 46 and 47, and it will be quite obvious from the foregoing description that a normal adjustment may be obtained in which the springs are under substantially balanced tension, so that unless one spring or the other receives a greater compression, there will be no sleeve motion. The alternating compression of the springs 56 and 58 is produced by means of the fingers 35 and 36, as moved by the oscillations of the shaft 34, which in turn are due to the swinging of the frame 33 by means of the cam disk 32, rotated from the driving shaft 23. Each of the sleeves 54 and 55 has a knuckle joint 60 or 61, by which it is connected to the holder 62 or 63 of the caliper head or "feeler", which carries an adjustable angle arm 64 or 65, having upon its extremity a steel roller 66, 67 which approaches to and recedes from the back of its respective grinding wheel 21 or 22 as its sleeve 54 or 55 oscillates. Assuming the grinding wheels to be normal, that is to say not yet worn away, and properly set on the shaft, then the oscillations of the shaft 34 will produce no effect on the caliper contacts 17—50 or 18—51, because the oscillations of the sleeves 54 and 55 due to the changes in compression of the springs 56 and 58 can only move the caliper heads or feelers as far as the back surfaces of the respective wheels, when they stop. Under normal conditions this movement is not sufficient to swing the lever 46 or 47 over so as to close its contact. If the wheel is worn away however, and its initial movement under spring tension on the shaft therefore carries it nearer to the surface of the work, (without as yet producing a working pressure thereon) then the caliper at the next oscillation moves beyond normal a distance corresponding to the initial movement of the wheel, the lever 46 or 47 is swung far enough to close upon its contact 17 or 18 and a circuit is thereby completed which includes one of the solenoids 68 or 69, which, deriving current from the supply circuit 70, immediately pulls in its core 71 or 72, turning the ratchet plate 73 or 74, also the ratchet 75 or 76 and the feed shaft 77 or 78. The solenoids are mounted on posts 6 and 8, closely adjacent to the bearing posts 9 and 10, and each core is normally retracted by a spring 78 or 79. The feed shafts are journaled respectively in the posts 9—13 and 10—13, and are right and left handed, so as to feed their respective wheels away from each other, and against the inner faces of the work.

In Fig. 6 I show a modification of the calipering mechanism whereby the feelers are made to follow up the wear and adjustment of their respective wheels. It comprises a spur wheel 112 that meshes with a spur on the shaft 77ª and transmits its motion through miters 113, 114 to shaft 115, thence through miters 116, 117 to shaft 118, which carries a spur 119, meshing with a spur on the feed shaft 111, thus feeding the bracket 64 and feeler 66 toward the grinding wheel 21.

The body of the wheel W is formed of abrasive material such as carborundum or the like, properly shaped and with suitable fittings to secure it to the spindle. As it would be impracticable to apply automatic calipers directly to the surface of this abrasive material, I provide inserts in the shape of annular bodies of anti-friction material at 31 and 32. The best material for this purpose which I have found up to the present time is graphite molded into channels or grooves in the wheels. One process of molding consists in mixing the graphite with water to form a thick paste, and then pressing this into the grooves so as to expel as much of the water as possible, and evaporating the rest. This process, however, is not entirely reliable in its results because of the shrinkage of the paste in drying, unless constant and very heavy pressure is employed, such as that obtainable by hydraulic means, with the attendant danger of fracturing the wheel. I prefer, therefore, to employ a binder which under ordinary conditions of temperature and pressure is a solid, and which can remain permanently incorporated with the graphite. Such a binder I have found in sulfur, which does not seem to affect the operation of the wheel or impair the efficiency of the graphite for my purpose. This is first melted, and the powdered graphite is stirred or ground into it in the proportion of two parts by weight of graphite to one of sulfur. The wheel body is then heated to a uniform temperature of about 212° Fahrenheit, the paste is poured or pressed into the grooves, and the whole allowed to cool. The two rings 31 and 32 thus formed present a smooth anti-friction surface for the calipers, sufficiently hard for accurate dimensioning, while I have found that the insert will wear away uniformly with the surface of the abrasive material and will not deter the grinding by its lubricant qualities.

Fig. 9 shows the back of a wheel, with a ring of graphite composition 108, upon which the roller 66 of the caliper bears. This ring may be similar to those hereinbefore referred to, but held in an undercut or dovetailed recess or groove. The composition I have employed for this ring when set into the wheel body, is formed of powdered or flake graphite held in a binder of sulfur. The sulfur is first melted, and the graphite is stirred or ground into it in the proportion of two parts by weight of graphite to one of sulfur. The wheel body having been prepared with the dovetailed recess as shown by dotted lines in Fig. 2, is heated to a uniform temperature of about 212° Fahrenheit, the graphite paste is poured or pressed into the groove, and the body allowed to cool. I prefer, however, to set the ring into the metal clamping plate on the back of the wheel, for several reasons. For one thing, this enables the use of standard or "stock" wheels; for another, it enables pure graphite to be employed, inserted in the groove under pressure which the wheel body could not resist. The ring can be made in several other ways, as by forming a paste of water, a gum solution, or the like. In any case and whether set in the wheel body or the clamping plate, I find that the undercut groove is of value in holding the ring in place, and as it constitutes an improvement over the former arrangement I shall claim it herein.

The claims herein are limited to the calipering device with the coöperating parts, and I do not claim the grinding wheel with inserts of antifriction material or the method of making the same, as these are claimed in a separate divisional application filed May 27, 1910, Serial No. 563,755.

Having thus described my invention what I claim and desire to secure by Letters Patent is—

1. A caliper mechanism for grinding machines comprising a carriage, means for reciprocating said carriage, a caliper finger moved thereby, a swinging arm controlled by the finger, and means carried by the arm to affect the compensating feed devices of a grinding machine.

2. A caliper mechanism for grinding machines comprising a carriage, means for reciprocating said carriage, a caliper finger moved thereby, a swinging arm controlled by the finger, electrical contacts controlled by the swinging arm, and circuit connections therefrom adapted to control compensating feed mechanism.

3. An automatic caliper comprising a frame, a carriage, a calipering finger carried thereon, a pivoted lever arm controlled thereby, a cam shaft, a rotating cam for reciprocating said shaft, and a connection between the shaft and the carriage.

4. An automatic caliper comprising a frame, a carriage, a calipering finger carried thereon, a pivoted lever arm controlled thereby, a cam shaft, a rotating cam for reciprocating said shaft, and a yielding connection between the shaft and the carriage.

5. An automatic calipering device comprising a frame, a shaft mounted to reciprocate therein, a cam frame mounted upon said shaft, a cam disk journaled to rotate within said cam frame and thereby to reciprocate the shaft, a pair of carriages on said shaft, adapted to reciprocate in the main frame, a pair of collars on the shaft, coiled springs interposed between the collars and carriages, a caliper finger pivotally and adjustably mounted on each carriage, a swinging independently pivoted lever for each carriage, having its short arm pivoted thereto, and electrical contacts carried by the long arms of said levers, together with circuit connections from said contacts adapted to control compensating feed mechanism.

In testimony whereof I affix my signature in presence of two witnesses.

HENRY B. NICHOLS.

Witnesses:
　JAS. HEYWOOD,
　GEO. B. TAYLOR.